(12) United States Patent
Schneider

(10) Patent No.: US 8,667,568 B2
(45) Date of Patent: Mar. 4, 2014

(54) SECURING A PASSWORD DATABASE

(75) Inventor: James Paul Schneider, Raleigh, NC (US)

(73) Assignee: Red Hat, Inc., Raleigh, NC (US)

(\*) Notice: Subject to any disclaimer, the term of this patent is extended or adjusted under 35 U.S.C. 154(b) by 782 days.

(21) Appl. No.: 12/156,313

(22) Filed: May 29, 2008

(65) Prior Publication Data

US 2009/0327740 A1 Dec. 31, 2009

(51) Int. Cl.
*H04L 29/06* (2006.01)
(52) U.S. Cl.
USPC .............. 726/6; 713/183; 713/182; 726/5
(58) Field of Classification Search
USPC .............................................. 713/183; 726/6
See application file for complete search history.

(56) References Cited

U.S. PATENT DOCUMENTS

| | | | | |
|---|---|---|---|---|
| 6,122,741 | A   * | 9/2000  | Patterson et al. | 726/17 |
| 6,990,592 | B2 * | 1/2006  | Richmond et al. | 726/15 |
| 2002/0035697 | A1 * | 3/2002  | McCurdy et al. | 713/200 |
| 2002/0188854 | A1 * | 12/2002 | Heaven et al. | 713/186 |
| 2003/0149900 | A1 * | 8/2003  | Glassman et al. | 713/202 |
| 2003/0229554 | A1 * | 12/2003 | Veres et al. | 705/35 |
| 2006/0130135 | A1 * | 6/2006  | Krstulich et al. | 726/15 |
| 2007/0006305 | A1 * | 1/2007  | Florencio et al. | 726/22 |
| 2007/0011100 | A1 * | 1/2007  | Libin et al. | 705/65 |
| 2007/0220604 | A1 * | 9/2007  | Long | 726/22 |
| 2008/0052533 | A1 * | 2/2008  | Iida et al. | 713/189 |

\* cited by examiner

*Primary Examiner* — Yogesh Paliwal
(74) *Attorney, Agent, or Firm* — Lowenstein Sandler LLP

(57) ABSTRACT

An apparatus and a method for storing an encrypted username and password. In one embodiment, a username is encrypted. A password associated with the username is encrypted. A user identifier associated with the username is encrypted. The encrypted username, the encrypted password, and the user identifier are stored in one or more database.

20 Claims, 4 Drawing Sheets

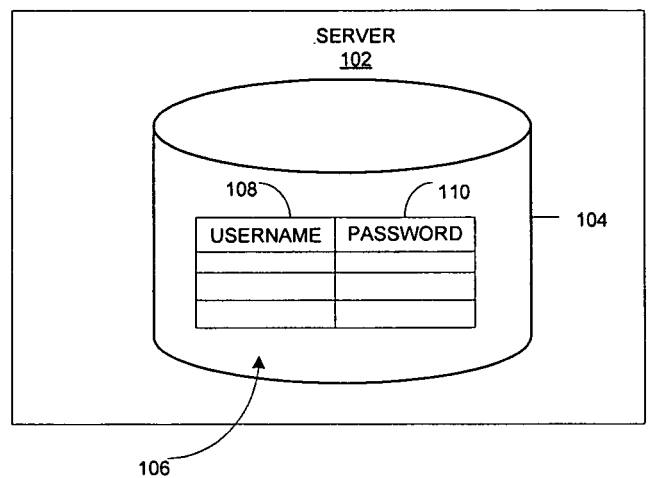
FIG. 1 – PRIOR ART
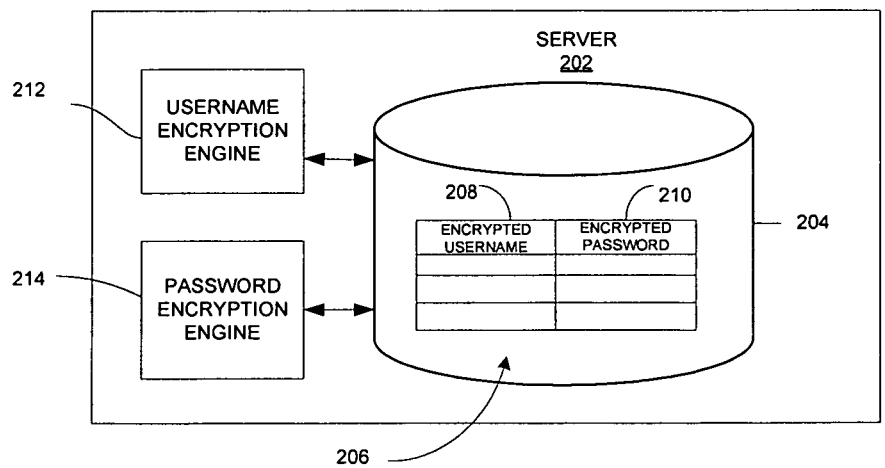
FIG. 2

SECURING A PASSWORD DATABASE

Embodiments of the present invention relate to computing systems, and more particularly, to securing a password database.

BACKGROUND

One means of authentication includes the use of password on computer systems. For example, on UNIX-type systems, the password for an account is stored in a hashed form. To make it harder for an attacker who has access to the hashed password to perform a class of brute force attacks and potentially gain knowledge of several passwords at once, the password is augmented with a small random value, also known as "salt" before it is hashed. The salt value and the hashed password are then stored in association with other account properties. Ordinarily, only passwords are encrypted and protected while other account credentials are not.

Thus, if the password database were to be compromised, an attacker would be able to impersonate any user on the system. As such, a need exists for a technique where if an attacker were to gain access to the encrypted password file, the attacker would have to perform a brute-force attack against both the username and the password.

BRIEF DESCRIPTION OF THE DRAWINGS

The present invention is illustrated by way of example, and not by way of limitation, in the figures of the accompanying drawings and in which:

FIG. 1 is a block diagram illustrating a username and password storage in accordance with a prior art.

FIG. 2 is a block diagram illustrating one embodiment of a username and password storage.

DETAILED DESCRIPTION

Figure 3:
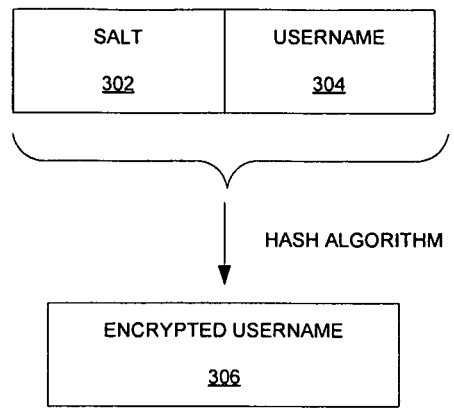
FIG. 3 is a block diagram illustrating one embodiment of an encryption of a username.

Described herein is a method and apparatus for storing an encrypted password and username. In one embodiment, a username is encrypted. A password associated with the username is encrypted. A user identifier associated with the username is encrypted. The encrypted username, the encrypted password, and the user identifier are stored in one or more database. If an attacker were to gain access to the encrypted password file, the attacker would have to perform a brute-force attack against both the username and the password. In one embodiment, the encryption of the password depends on the plaintext value of the username. In such case, the effort to break a particular username-password pair is doubled.

FIG. 1 is a block diagram illustrating a conventional username and password storage. A storage 104 of a server 102 stored a table of usernames 108 and passwords 110 in plain text (e.g. non-encrypted). As such, an attacker having access to the database 104 is able to obtain the usernames 108 and corresponding passwords 110.

In another system, a password is encrypted using a username-based authentication scheme and stored with a plaintext username. However, if the password database were to be compromised, an attacker would be able to impersonate any user on the system because the proof of knowledge of the encrypted password is assumed to prove identity.

FIG. 2 illustrates a database 204 of a server 202 in accordance with one embodiment. Instead of storing the password with the username in plaintext as described in FIG. 1, an encrypted version of the username is used. In this case, using a key-dependent hash that is iterated a few hundred times in accordance with one embodiment. Since both the username and the hashed password are needed to authenticate, the attacker would not only need to guess the username, but also attempt to validate it against the encrypted version.

In one embodiment, a username encryption engine 212 can be configured to encrypt using, for example, a hashing algorithm with several iterations. A password encryption engine 214 may be configured to encrypt using, for example, another hashing algorithm with several iterations. The encrypted usernames 208 and corresponding passwords 210 are stored in a table 206 in database 204.

In accordance with another embodiment, a user identifier (e.g. a user ID) associated with the username can also be encrypted and stored in the database 204.

In accordance with another embodiment, a property associated with the username and the user identifier can be encrypted and stored in the database 204. Alternatively, the encrypted usernames 208, the encrypted passwords 210, the encrypted user identifiers are stored in a first database of the server 202. The encrypted properties are stored in a second database of the server 202.

In one embodiment, username encryption engine 212 combines the username with a salt value and computes the combined username and salt value using a hashing algorithm. In one embodiment, the salt value can be based on the encrypted password, the username, and an authentication context identifier.

In one embodiment, password encryption engine 214 combines the password with a salt value and computes the combined password and salt value using a hashing algorithm. The salt value can include a random string or can be based on the username and an authentication context identifier. When the salt value is a random string, it is stored with the encrypted password.

FIG. 3 is a block diagram illustrating one embodiment of an encryption of a username. In one embodiment, a salt value 302 is combined with a username 304. The combined salt value 302 and username 304 is computed using a hashing algorithm to yield the encrypted username 306. The salt value can include a random string or can be based on the username and an authentication context identifier.

Figure 4:
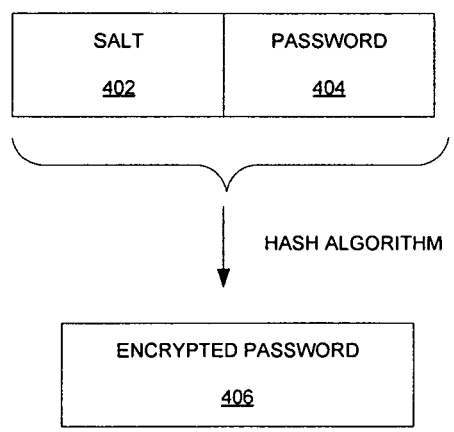
FIG. 4 is a block diagram illustrating one embodiment of an encryption of a password.

FIG. 4 is a block diagram illustrating one embodiment of an encryption of a password. In one embodiment, a salt value 402 is combined with a password 404. The combined salt value 402 and password 404 is computed using a hashing algorithm to yield the encrypted password 406. The salt value can include a random string or can be based on the username and an authentication context identifier.

Figure 5:
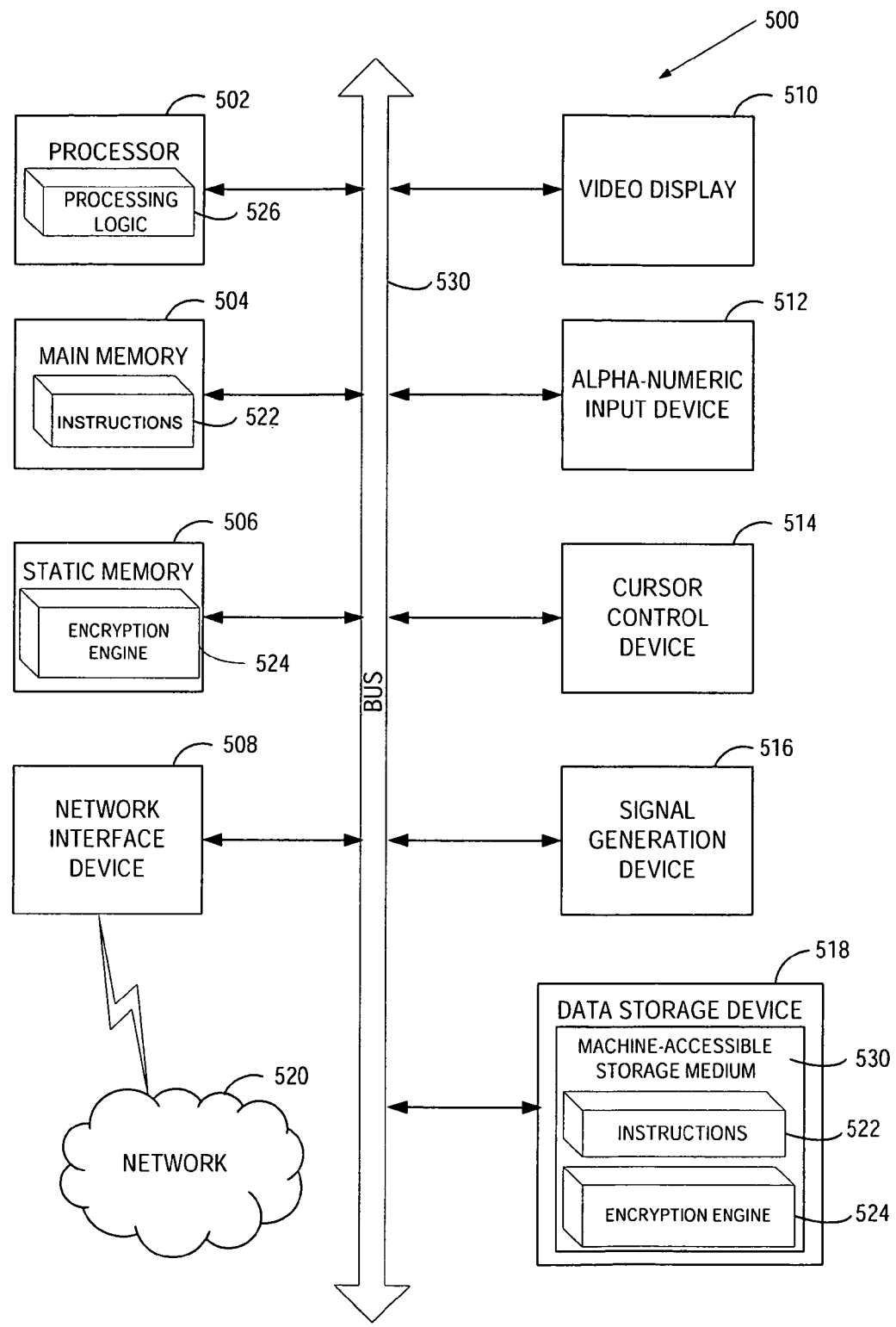
FIG. 5 is a block diagram illustrating an example of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store the encryption engine 524 as presently described. The encryption engine 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Figure 6:
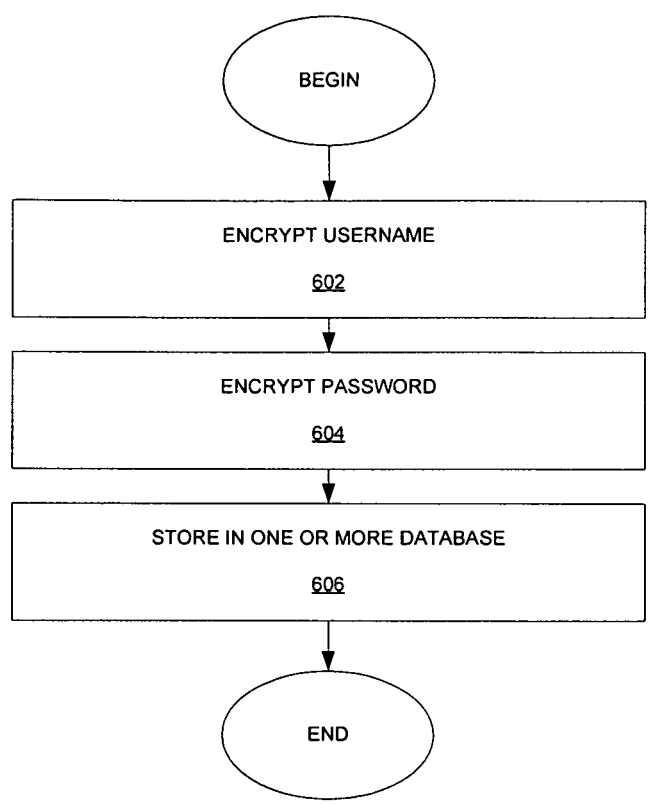
FIG. 6 is a flow diagram illustrating a method for encrypting and storing an encrypted username and password.

FIG. 6 is a flow diagram illustrating a method for encrypting and storing a username and password in a database. At 602, a username is encrypted with a hash algorithm. At 604, a password associated with the username is encrypted with another hash algorithm. At 606, the encrypted username and corresponding encrypted password are stored in one or more database.

To keep the database secure, other properties of an account are protected. For example, in a traditional UNIX system, an account is associated with a username, password, user ID, group ID, "GECOS" (normally, the account owner's name), home directory, and login shell. Ordinary utilities on UNIX expect to be able to determine a username from a user ID, and vice versa. Two levels of protection could come into play.

First, there would need to be a separation between a login username and an account name. The account name would take the role of the traditional username (being displayed as a file's owner, for example). The login username, which is only used for login authentication, should be different from the account name, although that is not an absolute requirement. Having distinct names prevents an attacker from just trying each account name with each encrypted password until it finds a match.

A second, optional level of protection would be to store the encrypted username, encrypted password, and an encrypted version of the user ID (which is an integer in its unencrypted form) in the password database, and store the other account properties in another database, keyed by the user ID. The user ID should be encrypted in a reversible manner (say, using the username-derived salt value as the key in a symmetric block cipher). By doing this, several fake entries can be stored in the password database, increasing the work required by an attacker to mount a brute force attack.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a-computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   encrypting, by a computer system, information pertaining to a user account, wherein the user account enables a user to access a system, and wherein the user account comprises a unique username and a password, and wherein the encrypting comprises:
   encrypting, using a first hash algorithm, the username;
   encrypting, using a second hash algorithm, the password;
   encrypting a user identifier associated with the username, wherein the user identifier is encrypted using a third algorithm that comprises a username-derived salt value as a key; and
   encrypting an account property of the user account, wherein the user identifier is a key for the account property;
   storing in a first location, by the computer system, the encrypted username, the encrypted password, and the encrypted user identifier; and
   storing in a second location, the encrypted account property.

2. The method of claim 1, wherein the first location is a first database, and wherein the second location is a second database.

3. The method of claim 1, wherein the username is augmented with a salt value prior to being encrypted.

4. The method of claim 3, wherein the salt value is based on the encrypted password, the username, and an authentication context identifier.

5. The method of claim 1, wherein the password is augmented with a salt value prior to being encrypted.

6. The method of claim 5, wherein the salt value is based on the username and an authentication context identifier.

7. The method of claim 1, wherein the encrypting of the password is based on a plaintext value of the username.

8. The method of claim 1, wherein the third algorithm comprises a block cipher.

9. A server comprising:
   a memory to store encrypted information pertaining to a user account, wherein the user account enables a user to access a system, and wherein the user account comprises a unique username and a password; and
   a processing device coupled to the memory to:
   encrypt, using a first hash algorithm, the username,
   encrypt, using a second hash algorithm, the password,
   encrypt a user identifier associated with the username, wherein the user identifier is encrypted using a third algorithm that comprises a username-derived salt value as a key,
   encrypt an account property of the user account, wherein the user identifier is a key for the account property,
   store in a first location the encrypted username, the encrypted password, and the encrypted user identifier, and
   store in a second location, the encrypted account property.

10. The server of claim 9, wherein the first location is a first database, and wherein the second location is a second database.

11. The server of claim 9, wherein the processing device is further to augment the username with a salt value prior to the encrypting of the username, wherein the salt value is based on the encrypted password, the username, and an authentication context identifier.

12. The server of claim 9, wherein the processing device is further to augment the password with a salt value prior to the encrypting of the password, wherein the salt value is based on the username and an authentication context identifier.

13. The server of claim 9 wherein the encrypting of the password is based on a plaintext value of the username.

14. A non-transitory computer-accessible storage medium comprising instructions stored therein which, when executed, cause a processing device to perform operations comprising:
   encrypting, by the processing device, information pertaining to a user account, wherein the user account enables a user to access a system, and wherein the user account comprises a unique username and a password, and wherein the encrypting comprises:
   encrypting, using a first hash algorithm, the username;
   encrypting, using a second hash algorithm, the password;
   encrypting a user identifier associated with the username, wherein the user identifier is encrypted using a third algorithm that comprises a username-derived salt value as a key; and
   encrypting an account property of the user account, wherein the user identifier is a key for the account property;
   storing in a first location, by the processing device, the encrypted username, the encrypted password, and the encrypted user identifier; and
   storing in a second location, the encrypted account property.

15. The non-transitory computer-accessible storage medium of claim 14, wherein the first location is a first database, and wherein the second location is a second database.

16. The non-transitory computer-accessible storage medium of claim 14, wherein the username is augmented with a salt value prior to being encrypted; and wherein the salt value is based on the encrypted password, the username, and an authentication context identifier.

17. The non-transitory computer-accessible storage medium of claim 14, wherein the password is augmented with a salt value prior to being encrypted.

18. The non-transitory computer-accessible storage medium of claim 17, wherein the salt value is based on the username and an authentication context identifier.

19. The non-transitory computer-accessible storage medium of claim 14, wherein the encrypting of the password is based on a plaintext value of the username.

20. The transitory computer-accessible storage medium of claim 14, wherein the third algorithm comprises a block cipher.

\* \* \* \* \*